United States Patent [19]

Satoh

[11] Patent Number: 4,483,608

[45] Date of Patent: Nov. 20, 1984

[54] VARIABLE MAGNIFICATION COPYING APPARATUS

[75] Inventor: Shiroh Satoh, Hachioji, Japan

[73] Assignee: Konishiroku Photo Industry Co., Ltd., Tokyo, Japan

[21] Appl. No.: 448,181

[22] Filed: Dec. 9, 1982

[30] Foreign Application Priority Data

Dec. 10, 1981 [JP] Japan .............................. 56-199074

[51] Int. Cl.[3] ...................... G03B 27/34; G03B 27/40; G03B 27/70; G03G 15/28

[52] U.S. Cl. .......................................... 355/8; 355/51; 355/57; 355/65; 355/66

[58] Field of Search .................. 355/8, 11, 51, 55, 56, 355/57, 60, 65, 66, 71; 350/255, 422, 429

[56] References Cited

U.S. PATENT DOCUMENTS 4,264,188 4/1981 Tomosada et al. ................ 355/8 X
4,270,858 6/1981 Minoura et al. ........................ 355/8
4,274,733 6/1981 Sugiura et al. ..................... 355/8 X
4,279,497 7/1981 Satomi ................................... 355/8
4,291,973 9/1981 Brooke ............................... 355/8 X
4,295,736 10/1981 Ikeda ................................. 355/8 X
4,298,271 11/1981 Sugiura et al. ......................... 355/8
4,299,475 11/1981 Nagahara ............................... 355/8
4,302,095 11/1981 Calabrese ............................... 355/8
4,386,843 6/1983 Seedhouse .............................. 355/8
4,422,756 12/1983 Abe et al. ......................... 355/8 X

*Primary Examiner*—John F. Gonzales
*Assistant Examiner*—Terry Flower
*Attorney, Agent, or Firm*—Frishauf, Holtz, Goodman and Woodward

[57] ABSTRACT

A variable magnification copying apparatus for obtaining a copy changed in size from an original pattern comprises an optical system having an optical axis, a movable carrier on which the optical system is mounted so as to be movable with the carrier and a D.C. motor mounted on the carrier. The carrier is reciprocable relative to a chassis of the copying apparatus in the direction of the optical axis between at least first and second position. The D.C. motor drives the carrier in a self-propelled manner relative to the chassis in the direction of the optical axis between at least first and second positions to thereby move the optical system between at least corresponding first and second positions to enable respective different sizes of the original pattern to be made at the corresponding first and second positions of the optical system.

14 Claims, 2 Drawing Figures

VARIABLE MAGNIFICATION COPYING APPARATUS

BACKGROUND OF THE INVENTION

The present invention relates to a variable magnification copying apparatus in which the focal distance of the optical system thereof is made variable stepwise and thereby either of the copied images can be reduced or magnified in size.

As for the copying apparatus of this kind, there have been known one as shown in FIG. 1 which is a schematic illustration of the optical system of an optical system reciprocation type copying apparatus.

In FIG. 1, an original pattern placed on a glass plate 2 is projected onto a photosensitive receptor drum 8 by means of light from an exposure lamp 1 through a first mirror 3, a second mirror 4, a third mirror 5, a projection lens 6 (mounted to a light shielding base board 12) and a fourth mirror 7, while keeping the distance from the original pattern to the projection lens 6 unchanged by sliding the mirrors 4 and 5 along a guide-roller 9 at half the speed of the constant speed at which the exposure lamp 1 is slid. The original pattern is formed into an electrostatic latent image on the photosensitive receptor drum 8 which rotates synchronously. For attaining a copy reduction or magnification, the projection lens 6 on a carrier is moved to a certain distance in the direction of the optical axis thereof and compensation lenses 10 are automatically interposed in the optical path of the projection lens 6 so as to compensate the aspect ratio of the image pattern in accordance with the correlation between the optical system and the photosensitive receptor drum 8 being rotated at a constant speed.

In such a conventional variable magnification type copying apparatus, the movements of the projection lens 6 and the interposition of the compensation lenses 10 have been performed by controlling the operation (movement and stop in motion) of a motor through such a controller as a microcomputer provided in the main body of a copying apparatus with a driving mechanism comprising an A.C. motor and chain-sprockets, a microswitch for detecting the position of the projection lens, an electromagnetic clutch for connecting to the carrier for the projection lens, a brake for stopping the movement and the like.

The conventional type apparatus of this kind has generally used A.C. motors and therefore the power unit thereof has unnecessarily increased in size, and the lens movement unit thereof has also required a guide-member which is expensive and large-sized, such as a combination unit of a shaft member and a slide member, or a built-in steel rail, in order to guide a relatively heavy load with a high accuracy. The abovementioned facts have partly necessitated the whole body of a copying apparatus to be made relatively large in size. In the conventional apparatus, it has also been difficult to combine a unit for moving the projection lens and the driving unit thereof into a single body to save space in the apparatus. Therefore many disadvantages have still remained unsolved in the assembly work, adjustments and maintenance services because it has taken time and trouble to combine and position these two units when the optical system is mounted to the body of apparatus.

SUMMARY OF THE INVENTION

It is an object of the invention to provide a novel variable magnification copying apparatus in which the above problems are solved by combining a driving system and an optical system in a single body. According to the present invention a D.C. motor is adapted to serve as a variable magnification driving power source. The D.C. motor is mounted onto a carrier, on which an optical system is mounted so as to be movable with the carrier, for driving the carrier in the direction of the optical axis of the optical system between at least first and second positions. The carrier is self-propelled by the driving force generated by the D.C. motor between the carrier and a fixed member of the copying apparatus. The movement of the carrier causes the optical system to move between at least corresponding first and second positions to enable respective different sizes of the original pattern to be made at the corresponding first and second positions of the optical system.

DETAILED DESCRIPTION

Figure 1:
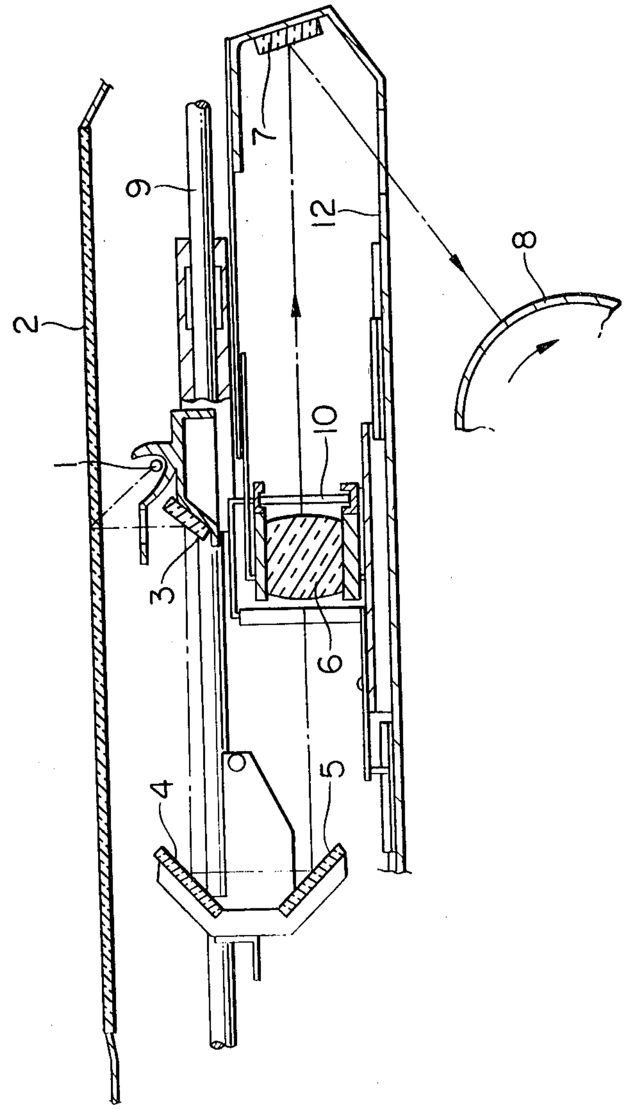
FIG. 1 PRIOR ART
FIG. 1 is a schematic illustration of a prior art optical system of a copying apparatus.
Figure 2:
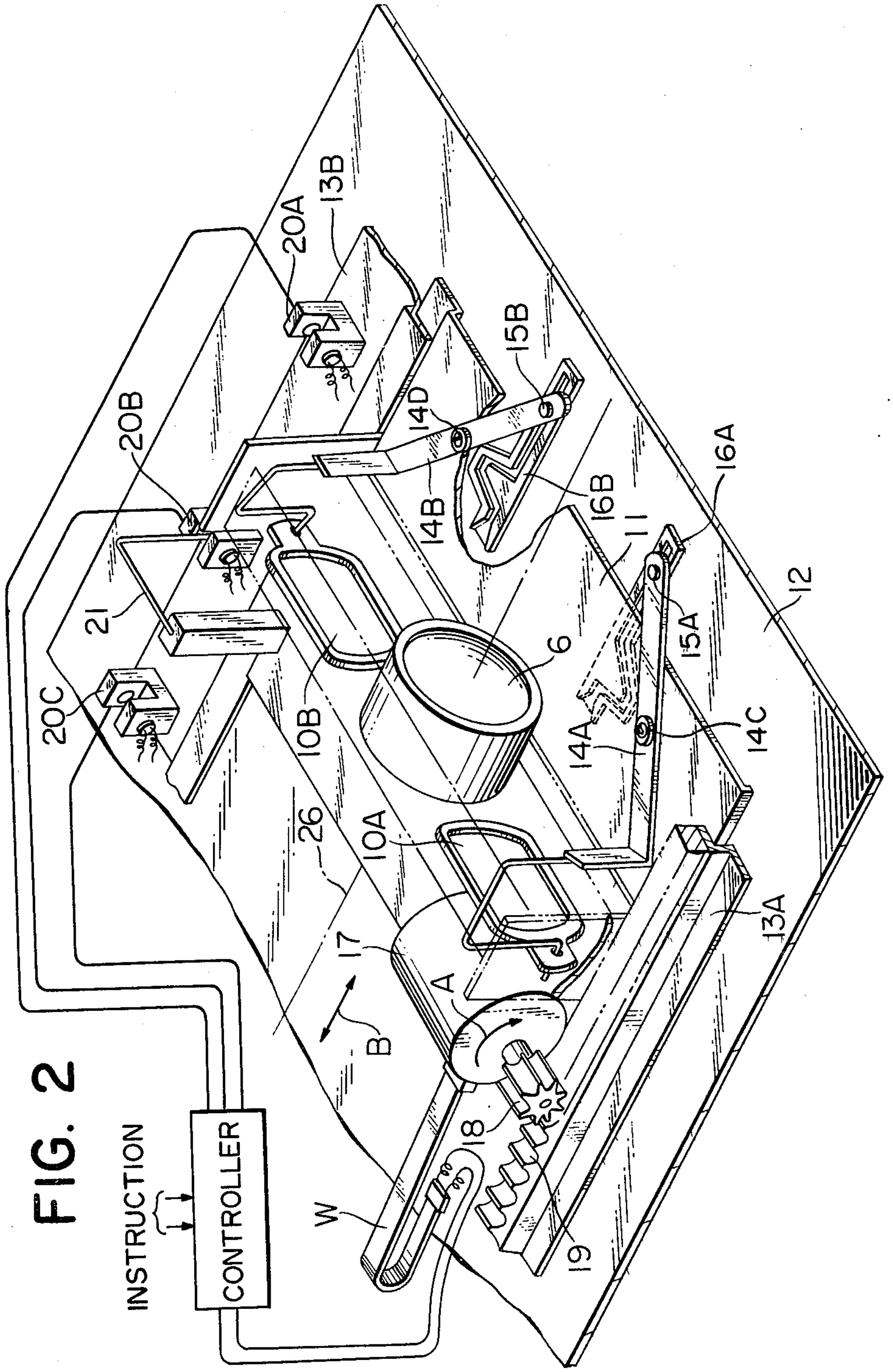
FIG. 2 is a perspective view showing a variable magnification mechanism of an embodiment of the present invention.

In FIG. 2, a carrier 11 carries a projection lens 6 and is mounted on a light-shielding board 12 which also serves as a fixed member of the apparatus such as a chassis of the mechanism. The carrier 11 freely reciprocates in the direction of the optical axis 26 (i.e., direction of arrow B in FIG. 2) of the projection lens 6 along guide rails 13A and 13B which are mounted on both sides of and in parallel with the optical axis 26, and generally straight inverted L-shaped elongated member, respectively. Further, the carrier 11 comprises a substantially straight portion slidably engageable between the inverted L-shaped guide rails and the fixed member of the apparatus. Compensation lenses 10A, 10B mounted on the carrier 11 are respectively arranged so as to be selectively moved into the optical path of the projection lens 6 from the side of the projection lens 6 with a certain distance from the projection lens 6 by means of sliding guides (not shown in FIG. 2) on the carrier 11. The compensation lenses 10A, 10B are interposed in the proper position on the optical axis by the swing action of a respective lever 14A or 14B, each of which is pivotally mounted to the carrier 11 at pivots 14C and 14D, respectively. Levers 14A, 14B have cam pins 15A and 15B respectively, which respectively engage with guide members (or cam tracks) 16A, 16B provided on the light shielding board 12. Due to the movement of the carrier 11, and the special shape of the guide members 16A, 16B, the corresponding lever is swung. The swing action thereof align the corresponding compensation lens 10A or 10B with the projection lens 6 when the projection lens 6 is moved to the reduction or magnification position.

A D.C. motor 17 is provided on the carrier 11 so as to serve as a variable magnification driving power source. A pinion 18 is connected to the shaft of the D.C. motor 17 and is engaged with a rack gear 19 on the guide rail 13A. The carrier 11 is moved by driving the motor 17 clockwise (direction of arrow A) or counterclockwise (direction opposite to arrow A). Electrical drive power is applied to the motor 17 from the control section of the copying apparatus body through a flexible lead wire W, or the like. Directional control of the movement of carrier 11 is accomplished by switchably reversing the polarity of the drive voltage for motor 17 by means of the controller shown in FIG. 2.

For detecting the predetermined fixed position (or first and second positions) where the carrier should be stopped respectively for reduction copying, regular copying and magnification copying, photoelectric sensing means such as photosensors 20A, 20B, 20C, are arranged on the guide rail 13B in the direction of the optical axis. The position of the carrier 11 is detected when a light-shielding pin (or light-blocking member) 21 mounted on the carrier 11 is positioned at a light-projecting point oppositely facing one of the photosensors 20A, 20B, 20C with the movement of the carrier 11.

The control of a variable magnification mechanism being constituted as mentioned above is performed by controlling the D.C. motor 17 by means of a controller to serve as the controlling unit for the mechanism in the case of a reduction copy or magnification copy. On the other hand, in the case of a regular copy, the carrier 11 is in a state of rest wherein the light-blocking pin 21 is in the position of the light sensor 20B, and the compensation lenses 10A, 10B are in rest positions out of the optical axis respectively, as illustrated in FIG. 2. To change the abovementioned state into that for a magnification copy, the controller having been given an instruction for magnification copy, energizes the D.C. motor 17 to rotate clockwise or counter-clockwise (as applicable). The D.C. motor 17 is stopped in operation by the output from the photosensor 20C at the moment when the light-blocking pin 21 reaches the photosensor 20C with the movement of the carrier 11, and thus, the change of the state is made for a magnification copy. At the same time, the compensation lens 10A is interposed on the optical axis by the movement of the carrier 11. In a similar manner, to make a reduction copy, the movement of the carrier 11 to the position of the photosensor 20A is effected by controlling the D.C. motor 17.

In the present invention an optical system and a driving system thereof are integrated in a single body, wherein a D.C. motor serves as a variable magnification driving power source for the optical system, including a projection lens, compensation lenses and the interposing member thereof, of which the focal distance is variable stepwise, and said D.C. motor is mounted on a carrier for the optical system to generate the driving force to apply between the chassis of the optical system and the carrier, by which the optical system is controllably moved to the position for a reduction copy or a magnification copy with the self-propulsion of the carrier driven by the D.C. motor. Therefore, the combination of the driving power source with the optical system moving mechanism is relatively simplified. The carrier is mounted only with the D.C. motor and a light-blocking pin so that the carrier for moving the optical system can be lightened in weight and further the D.C. motor can be made relatively small in size. The driving power unit as well as the optical system moving mechanism can be made relatively small in size. Also accurate movement of the optical system can be performed by means of the relatively simplified guide rails. Such a combination of the driving system and the optical system makes a variable magnification device utilized and makes a copying apparatus easy to assemble, adjust and maintain. The movement control of the optical system can only be made by energizing the D.C. motor switchably from the positive to negative and vice versa and by stopping the D.C. motor by means of position defining means such as the photosensors 20A, 20B and 20C, so that the controller therefor is relatively simplified. In the present invention, the carrier can be moved in the direction to provide magnification by taking the shortest course by making use of the D.C. motor. Therefore, there is such an effect that the time required for switching over to a magnification operation could be shortened.

What is claimed is:

1. In a variable magnification copying apparatus for obtaining a copy changed in size from an original pattern, the improvement comprising in combination:

an optical system having an optical axis;

a movable carrier on which said optical system is mounted so as to be movable with said carrier, said carrier being reciprocable relative to a fixed member of the copying apparatus in the direction of said optical axis between at least first and second positions; and a D.C. motor mounted on said carrier for driving said carrier in a self-propelled manner relative to said fixed member in the direction of said optical axis between at least said first and second positions to thereby move said optical system between at least corresponding first and second positions to enable respective different sizes of the original pattern to be made at said corresponding first and second positions of said optical system.

2. The variable magnification copying apparatus of claim 1, wherein said at least first and second positions of said carrier are respective first and second predetermined fixed positions.

3. The variable magnification copying apparatus of claim 2, further comprising position defining means which includes first means on said carrier for defining said first and second predetermined fixed portions of said carrier.

4. The variable magnification copying apparatus of claim 3, wherein said position defining means further comprises second means mounted externally of said carrier and cooperable with said first means on said carrier for defining said first and second predetermined fixed positions of said carrier.

5. The variable magnification copying apparatus of claim 4 wherein said second means includes a plurality of photoelectric sensing means at positions corresponding to said predetermined fixed positions of said carrier, said photoelectric sensing means being coupled to said motor; and said first means includes at least one light blocking member for selectively blocking light directed to at least one of said sensing means when said carrier is at a fixed position thereof.

6. The variable magnification copying apparatus of claim 1, wherein said optical system mounted on said carrier comprises a projection lens fixedly mounted on said carrier, and at least one compensation lens movably mounted on said carrier and which is selectively movable into and out of said optical axis of said projection lens.

7. The variable magnification copying apparatus of claim 6, further comprising means mounted to said carrier and coupled to said at least one compensation lens for moving said compensation lens into said optical axis of said projection lens when said carrier is at one of said first and second fixed positions, and for moving said compensation lens out of said optical axis of said projection lens when said carrier is at the other of said first and second fixed positions.

8. The variable magnification copying apparatus of claim 7, wherein said means for moving said compensation lens comprises a first lever movably mounted to said carrier and comprising a cam pin; and a cam track mounted externally of said carrier and in a fixed position, said cam pin engaging said cam track during movement of said carrier between said first and second fixed positions.

9. The variable magnification copying apparatus of claim 1, further comprising:

first and second guide rails on said fixed member of said copying apparatus and slidably engaging said carrier so that said carrier is slidable relative to said guide rails and relative to said fixed member; and drive means mounted to said fixed member and engageable with said D.C. motor for moving said carrier relative to said fixed member.

10. The variable magnification copying apparatus of claim 9, wherein said drive means mounted to said fixed member comprises a rack gear, and wherein said D.C. motor comprises a pinion gear engageable with said rack gear.

11. The variable magnification copying apparatus of claim 10, wherein said rack gear is mounted to at least one of said guide rails.

12. The variable magnification copying apparatus of claim 9, wherein said guide rails comprises substantially straight generally inverted L-shaped elongated members, and said carrier comprises a substantially straight edge portion slidably engageable between said inverted L-shaped guide rails and said fixed member of said copying apparatus.

13. The variable magnification copying apparatus of claim 12, wherein said drive means mounted to said fixed member comprises a rack gear, and wherein said D.C. motor comprises a pinion gear engageable with said rack gear.

14. The variable magnification copying apparatus of claim 13, wherein said rack gear is mounted to at least one of said guide rails.

* * * * *